US010860925B2

(12) United States Patent
Tucker et al.

(10) Patent No.: US 10,860,925 B2
(45) Date of Patent: Dec. 8, 2020

(54) PROCESSING COMPUTATIONAL GRAPHS

(71) Applicant: Google LLC, Mountain View, CA (US)

(72) Inventors: Paul A. Tucker, Los Altos, CA (US); Jeffrey Adgate Dean, Palo Alto, CA (US); Sanjay Ghemawat, Mountain View, CA (US); Yuan Yu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 564 days.

(21) Appl. No.: 15/337,744

(22) Filed: Oct. 28, 2016

(65) Prior Publication Data
US 2017/0124452 A1  May 4, 2017

Related U.S. Application Data

(60) Provisional application No. 62/253,009, filed on Nov. 9, 2015, provisional application No. 62/247,709, filed on Oct. 28, 2015.

(51) Int. Cl.
*G06N 3/08* (2006.01)
*G06F 9/50* (2006.01)
(Continued)

(52) U.S. Cl.
CPC ............. *G06N 3/08* (2013.01); *G06F 9/5038* (2013.01); *G06F 9/5066* (2013.01);
(Continued)

(58) Field of Classification Search
None
See application file for complete search history.

(56) References Cited

U.S. PATENT DOCUMENTS 7,961,636 B1    6/2011  Barach
2006/0095721 A1  5/2006  Biles et al.
(Continued)

FOREIGN PATENT DOCUMENTS

JP    H04211858    8/1992
JP    H05108595    4/1993
(Continued)

OTHER PUBLICATIONS

Low, Yucheng, et al., "Distributed GraphLab: A Framework for Machine Learning and Data Mining in the Cloud", Aug. 2012, Proceedings of the VLDB Endowment, vol. 5, No. 8, pp. 716-727 (Year: 2012).*

(Continued)

*Primary Examiner* — Miranda M Huang
*Assistant Examiner* — Catherine F Lee
(74) *Attorney, Agent, or Firm* — Fish & Richardson P.C.

(57) ABSTRACT

Methods, systems, and apparatus, including computer programs encoded on computer storage media, for receiving a request from a client to process a computational graph; obtaining data representing the computational graph, the computational graph comprising a plurality of nodes and directed edges, wherein each node represents a respective operation, wherein each directed edge connects a respective first node to a respective second node that represents an operation that receives, as input, an output of an operation represented by the respective first node; identifying a plurality of available devices for performing the requested operation; partitioning the computational graph into a plurality of subgraphs, each subgraph comprising one or more nodes in the computational graph; and assigning, for each subgraph, the operations represented by the one or more nodes in the subgraph to a respective available device in the plurality of available devices for operation.

21 Claims, 4 Drawing Sheets

(51) Int. Cl.
*G06N 3/063* (2006.01)
*G06N 3/04* (2006.01)
*G06N 5/04* (2006.01)

(52) U.S. Cl.
CPC .......... *G06N 3/0454* (2013.01); *G06N 3/063* (2013.01); *G06N 3/084* (2013.01); *G06N 5/048* (2013.01)

(56) References Cited

U.S. PATENT DOCUMENTS

| | | |
|---|---|---|
| 2006/0095722 A1 | 5/2006 | Biles et al. |
| 2010/0325621 A1 | 12/2010 | Andrade et al. |
| 2014/0215477 A1 | 7/2014 | Chen et al. |
| 2015/0007182 A1 | 1/2015 | Rossbach et al. |
| 2015/0148919 A1 | 5/2015 | Watson |

FOREIGN PATENT DOCUMENTS

| | | |
|---|---|---|
| JP | 2001-117900 | 4/2001 |
| JP | 2004185271 | 7/2004 |
| JP | 2014-102917 | 6/2014 |
| JP | 2014-102996 | 6/2014 |

OTHER PUBLICATIONS

Kafil, Muhammad, et al., "Optimal Task Assignment in Heterogeneous Distributed Computing Systems", 1998, IEEE Concurrency, vol. 6, Issue 3, pp. 42-50 (Year: 1998).*
Parsons, E. W., and K. C. Sevcik, "Coordinated Allocation of Memory and Processors in Multiprocessors," 1996, ACM, pp. 57-67 (Year: 1996).*
Written Opinion issued in International Application No. PCT/US2016/059449, dated Sep. 27, 2017, 7 pages.
International Search Report and Written Opinion in International Application No. PCT/US2016/059449, dated Feb. 16, 2017, 13 pages.
International Preliminary Report on Patentability issued in International Application No. PCT/US2016/059449, dated Jan. 16, 2018, 17 pages.
JP Office Action in Japanese Appln. 2018-521825, dated Jul. 12, 2019, 14 pages (with English translation).
Dean et al, "Large scale distributed deep networks," NIPS, Dec. 2012, 9 pages.
Aoyagi et al, "Task allocation method based on static evaluation for heterogeneous grained system," Japan Society of Information Processing Society, Aug. 22, 1997, 6 pages.
EP Office Action in European Appln 16826785.4-1221, dated Aug. 28, 2019, 4 pages.
EP extended search report in European Application No. 20164537.1, dated Jun. 3, 2020, 10 pages.
JP Office Action in Japanese Appln. 2018-521825, dated Jan. 14, 2020, 16 pages (with English translation).
JP Pre-Appeal Report in Japanese Application No. 2018/521825, dated Jul. 21, 2020, 7 pages (with English translation).

* cited by examiner

PROCESSING COMPUTATIONAL GRAPHS

CROSS-REFERENCE TO RELATED APPLICATIONS

This application claims the benefit under 35 U.S.C § 119(e) of the filing date of U.S. Patent Application No. 62/247,709, entitled PROCESSING COMPUTATIONAL GRAPHS, which was filed on Oct. 28, 2015, and claims the benefit of U.S. Patent Application No. 62/253,009, entitled PROCESSING COMPUTATIONAL GRAPHS, filed on Nov. 9, 2015. The disclosures of the prior applications are considered part of and are incorporated by reference in the disclosure of this application.

BACKGROUND

This specification relates to processing computational graphs representing neural networks.

Neural networks are machine learning models that employ one or more layers of models to generate an output, e.g., one or more classifications, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters for the layer.

The layers of a neural network can be processed by an individual device. The device can have a processor that performs operations, e.g., generating outputs at a layer from inputs, and stores outputs from the operations in memory. Due to the large number and size of operations generally required to generate the outputs in the neural network, one device can take a significant amount of time to process the layers of the neural network.

SUMMARY

In general, this specification describes a system for processing computational graphs representing neural networks.

In general, one innovative aspect of the subject matter described in this specification can be embodied in methods that include the actions of receiving a request from a client to process a computational graph; obtaining data representing the computational graph, the computational graph comprising a plurality of nodes and directed edges, wherein each node represents a respective operation, wherein each directed edge connects a respective first node to a respective second node that represents an operation that receives, as input, an output of an operation represented by the respective first node; identifying a plurality of available devices for performing the requested operation; partitioning the computational graph into a plurality of subgraphs, each subgraph comprising one or more nodes in the computational graph; and assigning, for each subgraph, the operations represented by the one or more nodes in the subgraph to a respective available device in the plurality of available devices for operation.

Implementations can include one or more of the following features. The request specifies one or more particular outputs from one or more respective nodes, further comprising: receiving, from a device to which the one or more respective nodes are assigned, the one or more particular outputs; and providing the one or more particular outputs to the client. The operations represented by one or more nodes in the computational graph are inference or training operations for a neural network. The request comprises labels partitioning the computational graph into a plurality of predetermined subgraphs, and wherein partitioning the computational graph comprises partitioning the computational graph into the plurality of predetermined subgraphs. Each device is a hardware resource that performs operations independent of other devices in the plurality of devices. Assigning each subgraph to a respective device comprises assigning the subgraph to a device having a computational capability necessary to perform the operations represented by the nodes in the subgraph. Analyzing the computational graph to identify groups of nodes arranged in a chain structure; wherein the partitioning comprises generating, for each identified group, a respective subgraph including the identified group of nodes. Analyzing the computational graph to identify groups of nodes that operate on shared data flowing on directed edges to the group of nodes; wherein the partitioning comprises generating, for each identified group, a respective subgraph including the identified group of nodes. Determining an initial assignment of subgraphs to devices; monitoring the devices to determine statistics; adjusting the initial assignment using the statistics; and reassigning the subgraphs to the devices based on the adjusted initial assignment. Repeating the monitoring, adjusting, and reassigning until a threshold amount of improvement has been achieved. The statistics comprise a respective operation time or a respective idle time for each subgraph.

Particular embodiments of the subject matter described in this specification can be implemented so as to realize one or more of the following advantages. Operations, e.g., an operation to generate an inference from an input, of a neural network can be represented as a computational graph of nodes and directed edges. A system processes this computational graph representation to efficiently perform the operations of the neural network. The system achieves this efficiency because the computational graph has fewer abstractions than a conventional neural network represented as a sequence of layers. In particular, the computational graph can be more easily partitioned for parallel operations than the conventional neural network representation. By way of illustration, subgraphs of the computational graph can be assigned to unique devices, each of which performs operations in the respective subgraph, to reduce an overall time required to perform operations of the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
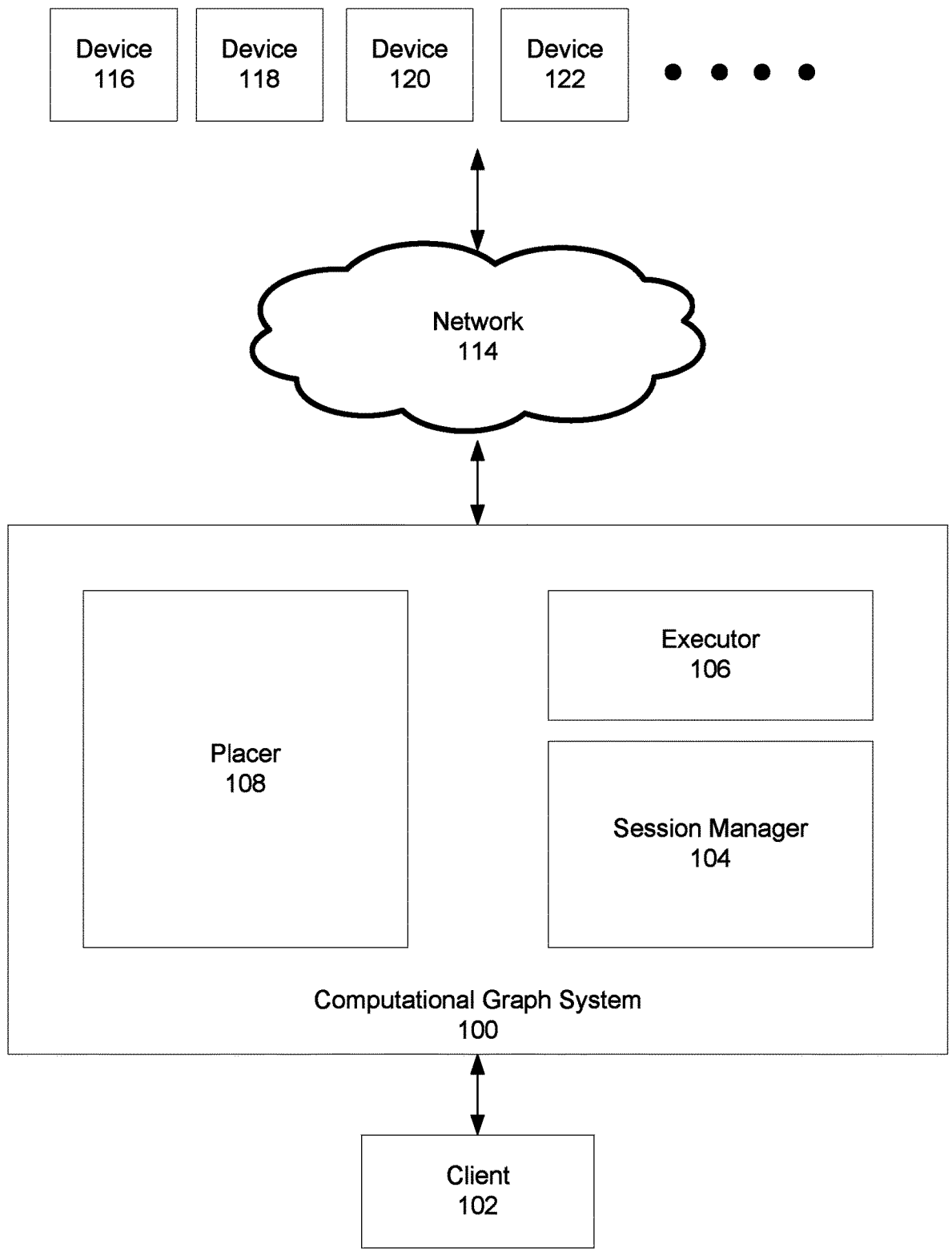
FIG. 1 illustrates an example computational graph system for distributing operations for neural networks represented as computational graphs.

This specification generally describes a computational graph system that performs operations represented by a computational graph in a distributed manner.

The computational graph includes nodes connected by directed edges. Each node in the computational graph represents an operation. An incoming edge to a node represents a flow of an input into the node, i.e., an input to the operation represented by the node. An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

Generally, the input and outputs flowing along directed edges in the computational graph are tensors. A tensor is a multidimensional array of numeric or other values, e.g., strings, having a specific order that corresponds to the dimensionality of the array. For example, a scalar value is a 0th-order tensor, a vector of numeric values is a 1st-order tensor, and a matrix is a 2nd-order tensor.

In some implementations, the operations represented in the computational graph are neural network operations or operations for a different kind of machine learning model. A neural network is a machine learning model that employs one or more layers of nonlinear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the network generate an output from a received input in accordance with current values of a respective set of parameters, while other layers of the network may not have parameters.

For example, the operations represented by the computational graph may be operations necessary for the neural network to compute an inference, i.e., to process an input through the layers of the neural network to generate a neural network output for the input. As another example, the operations represented by the computational graph may be operations necessary to train the neural network by performing a neural network training procedure to adjust the values of the parameters of the neural network, e.g., to determine trained values of the parameters from initial values of the parameters. In some cases, e.g., during training of the neural network, the operations represented by the computational graph can include operations performed by multiple replicas of the neural network.

By way of illustration, a neural network layer that receives an input from a previous layer can use a parameter matrix to perform a matrix multiplication between the parameter matrix and the input. In some cases, this matrix multiplication can be represented as multiple nodes in the computational graph. For example, a matrix multiplication can be divided into multiple multiplication and addition operations, and each operation can be represented by a different node in the computational graph. The operation represented by each node can generate a respective output, which flows on a directed edge to a subsequent node. After the operation represented by a final node generates a result of the matrix multiplication, the result flows, on a directed edge, to another node. The result is equivalent to an output of the neural network layer that performs the matrix multiplication.

In some other cases, the matrix multiplication is represented as one node in the graph. The operations represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., SoftMax, Sigmoid, rectified linear unit (ReLU), or convolutions.

Representing a neural network as a computational graph provides for a flexible and granular way to efficiently implement the neural network, especially if the operations for the neural network are distributed across multiple devices with different hardware profiles.

FIG. 1 illustrates an example computational graph system 100 for distributing operations for neural networks represented as computational graphs. The system 100 is an example of a system implemented as computer programs on one or more computers in one or more locations, in which the systems, components, and techniques described below can be implemented.

A user of a client 102 can request operations be performed on a computational graph representing a neural network. The client 102 can be an application running on a computer.

As part of the request, the client 102 provides data identifying a computational graph to the system 100 and specifies types of operations to be performed on the computational graph.

For example, the request can identify a computational graph representing an inference for a particular neural network and can identify an input on which the inference should be performed.

As another example, the request can identify a computational graph representing a training procedure for a particular neural network and can identify an input, such as training data, on which the training should be performed. In this example, when receiving a request to process a computation graph representing a training procedure, the system 100 can determine modified values for parameters for one or more edges of the computational graph, e.g., using conventional backpropagation or other neural network training techniques. The system 100 can store the modified parameters in memory of a device, and an executor 106 can retrieve and store, at the system 100, addresses of the modified weights. Upon further requests from the client 102 for inference, training, or other operations requiring the modified weights, the system 100 can access the modified weights using the addresses.

In some cases, the request may specify a response that should be transmitted in response to the request. For example, for a neural network training request, the client 102 can request an indication that the requested neural network training operations have been completed and, optionally, trained values of the parameters of the neural network or an indication of a memory location from which the trained values can be accessed by the client 102. As another example, for a neural network inference request, the client 102 can request output values that represent an inference operation from one or more particular nodes of the computational graph.

The system 100 performs the operations to generate the particular output by partitioning the operations represented by the computational graph across multiple devices 116-122. The system 100 partitions the operations to the multiple devices 116-122 over a data communication network 114, e.g., local area network (LAN) or wide area network (WAN). The devices 116-122 perform the operations and, if applicable, return a respective output or indication to the system 100, which can return the requested output or indication to the client 102.

Any devices performing neural network operations, e.g., devices 116-122, can include a memory, e.g., a random access memory (RAM), for storing instructions and data and a processor for executing stored instructions. Generally, each device is a hardware resource that performs operations independent of other devices. For example, each device can have its own processing unit. The devices can be Graphical Processing Units (GPUs) or Central Processing Units (CPUs). By way of illustration, one machine can host one or more devices, e.g., multiple CPUs and GPUs.

Each device can also have a respective computational capability. That is, devices can have different amount of memories, processing speed, or other architectural characteristics. Thus, some devices can perform operations that other devices cannot. For example, some operations require a certain amount of memory that only particular devices have, or some devices are configured to only perform a particular type of operation, e.g., inference operations.

A session manager 104 in the system 100 receives a request from the client 102 to start a session during which operations of the computational graph are performed. The session manager 104 manages the set of devices, e.g., devices 116-122, that can perform operations of the computational graph, and can provide a placer 108 with the set of devices that are available to perform operations.

The placer 108 determines, for each operation to be performed in the computational graph, a respective target device, e.g., device 116, that performs the operation, and in some implementations, a time for the respective target device to perform the operation. Some operations can be performed in parallel while other operations require prior operations in the computational graph to be completed, e.g., the other operations process, as inputs, outputs of the prior operations.

After the devices perform the operations allocated by the placer 108 to generate outputs, the executor 106 can retrieve the outputs. The executor 106 can generate an appropriate response to the request, e.g., an output or an indication that the processing has been completed. Then, the executor 106 can return the response to the client 102.

The session manager 104 also provides sets of operations to be performed in the computational graph to the executor 106. The executor 106 periodically retrieves runtime statistics from the devices 116-122 related to graph execution of operations. The executor 106 provides the runtime statistics to the placer 108, which can re-optimize placement and scheduling of further operations. This re-optimization will be described further below with reference to FIG. 2.

Figure 2:
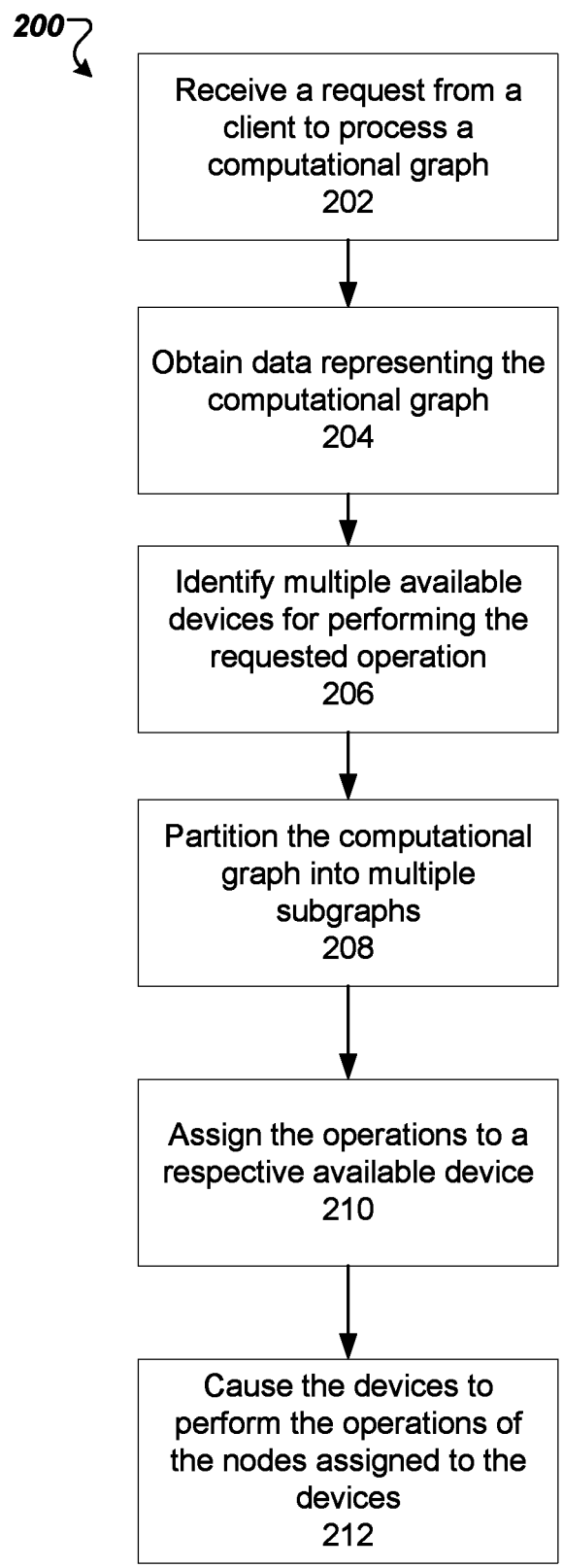
FIG. 2 is a flow diagram of an example method for processing computational graphs.

FIG. 2 is a flow diagram of an example process 200 for processing computational graphs. For convenience, the process 200 will be described as being performed by a system of one or more computers located in one or more locations. For example, a computational graph system, e.g., the computational graph system 100 of FIG. 1, appropriately programmed, can perform the process 200.

The system receives a request from a client to process a computational graph (step 202). For example, the request can be a request to perform a neural network inference represented by the computational graph on a specified input, a request to perform neural network training operations represented by the computational graph on a specified set of training data, or a request to perform other neural network operations represented by the computational graph, as described above with reference to FIG. 1.

The system obtains data representing the computational graph (step 204). In some cases, the data is sent with the request from the client. In other cases, the request identifies the computational graph and the system retrieves the data representing the identified graph from memory. By way of illustration, the data representing the graph can be an array of the nodes in the graph. Each node can contain information specifying an operation type, a name, and a list of incoming and outgoing edges to the node.

The system identifies multiple available devices for performing the requested operation (step 206). The system can connect to numerous devices, e.g., in a data center. The system can maintain a status of each device, e.g., using the executor 106 of FIG. 1. Each device can be either busy or available. A device is busy if the device is currently performing other operations and cannot be assigned further operations or is otherwise unavailable to perform graph processing operations. The device is available if the device can be assigned further operations, e.g., the further operations can be queued for operation by the device.

The system partitions the computational graph into multiple subgraphs (step 208). Each subgraph includes one or more nodes in the computational graph. In some implementations, the request from the client includes labels that specify how the computational graph should be partitioned into predetermined subgraphs. For example, a user can manually generate the labels for the computational graph and include the labels in the request. If the request includes such labels, the system partitions the computational graph into the predetermined subgraphs.

In some other implementations, the system partitions the computational graph based on how the computational graph is arranged. In particular, the system can analyze the graph to identify directed edges connecting one or more nodes in the computational graph that are arranged in a chain structure. Nodes in a chain structure are nodes that are connected to each other by following one directed edge from node to node. Thus, a node in the chain must wait for operations at previous nodes in the chain to finish computing before computing its own operation. Partitioning subgraphs will be described further with reference to FIG. 3.

In yet other implementations, the system clusters the nodes in the graph and then assigns the nodes in the same cluster to the same subgraph. In particular, the system can analyze the graph to identify nodes that operate on shared data flowing on directed edges. For example, multiple nodes can receive, as an input, the same data from a previous node. The system can cluster such nodes receiving the same data in the same subgraph so that when the subgraph is assigned to a particular device, the device can reuse memory storing the same data for the multiple operations represented by the nodes. This will be described further with reference to FIG. 3.

The system assigns, for each subgraph, the operations represented by the one or more nodes in the subgraph to a respective available device (step 210). In some implementations, the system assigns each subgraph to a device having a computational capability necessary to perform the operations represented by the nodes in the subgraph. In some implementations, the request from the client includes data specified by a user that identifies a particular type of device to perform operations for particular nodes. For example, the user can specify particular nodes with mathematically heavy operations should be assigned to a GPU. The system can assign subgraphs including the particular nodes to devices having the particular type.

In some other implementations, the system determines a device to which a subgraph is assigned by estimating a maximum amount of resources to be consumed by operations representing nodes in the subgraph. For example, the system can calculate a maximum amount of memory to be consumed by any node in the subgraph. In particular, the system can traverse the subgraph to calculate a dimension of a tensor on each directed edge to and from each node of the subgraph. The dimension of the tensor indicates a size of memory that would be consumed by a device to perform an operation. The system can assign the subgraph to a device that has memory capable of storing the largest tensor flowing in the subgraph.

Another implementation of assigning subgraphs to devices will be described further below with reference to FIG. 4.

The system causes the devices to perform the operations of the nodes assigned to the devices (step 212). In some implementations, the system sends each device a request to start the operations. The device receives the request and in response, starts performing the operations of the nodes assigned to the device. In some implementations, the devices perform the operations of the nodes assigned to the device asynchronously. For example, the devices can perform operations asynchronously using queues, non-blocking kernels, or both.

Figure 3:
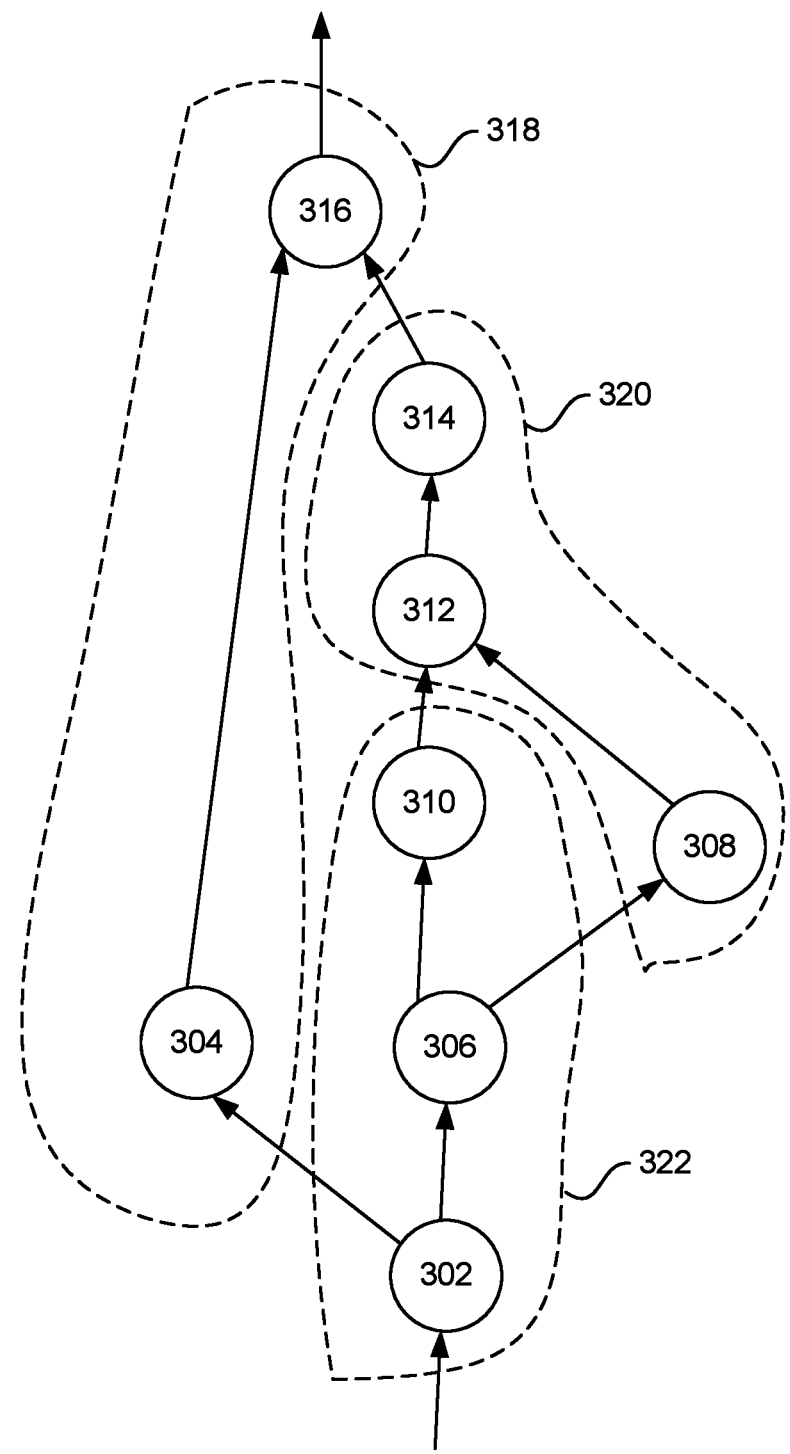
FIG. 3 is an example computational graph.

FIG. 3 illustrates an example computational graph. By way of example, a computational graph system, e.g., the system 100 of FIG. 1, can receive a request from a client to, given a set of inputs, compute an inference using the computational graph. In particular, the client can request an output of node 316. The set of inputs can be provided on a directed edge to the node 302.

The system can partition the computational graph into three subgraphs 318-322. To generate the subgraphs 318-322, the system can analyze the computational graph to identify chains of nodes. For example, the system can identify a first chain of nodes 304, 316, a second chain of nodes 302, 306, 310, and a third chain of nodes 308, 312, 314. Although other possible chains of nodes are possible, the system can select the chains that minimize the number of subgraphs. The system can group the chains of nodes into respective subgraphs.

In some implementations, if the outputs of node 306 are the same, the system groups nodes 306, 308, and 310 into one subgraph. This is because nodes 310 and 308 both receive the same output from the node 306. In this case, the operations represented by nodes 310 and 308 are performed on the same device to minimize memory consumption. That is, the device can access the same memory location that stores the output from the node 306 when performing operations for both node 310 and 308.

The system can assign the three subgraphs 318-322 to three respective available devices. The system can start by assigning a first subgraph 322 because it contains an initial node 302 and none of the nodes depend on outputs of other subgraphs. Once the first subgraph 322 is assigned, the system can assign the second subgraph 318. Node 304 in the second subgraph 318 requires an output of the node 302, which will be calculated by the device assigned to the first subgraph 322.

In some implementations, the system waits to assign the second subgraph 318 until receiving an indication that the operation represented by node 302 has completed. This allows the system to dynamically assign subgraphs based on current information, e.g., memory or device availability, which could improve efficiency. Upon receiving the indication, the system can assign the second subgraph 318 to a device capable of handling a size of the output of the node 302. In some other implementations, the system analyzes the graph to determine a dimension of the tensor flowing on the directed edge from node 302 and 304. The system can then assign the second subgraph 318 based on the dimension of the tensor. That is, the system assigns the second subgraph 318 to a device that can handle a memory requirement of the tensor to the second subgraph 318.

Similarly, the initial node 308 of the third subgraph 320 requires the output of the node 306. The system can wait to assign the third subgraph 320 until the device to which the first subgraph is assigned completes the operation represented by node 306. Once the operation represented by the node 306 completes, the system can analyze the output of the node 306 to assign the third subgraph 320 to a respective available device.

The devices can pause operations, e.g., enter in an idle state, at nodes that require inputs that have not yet been computed. For example, after performing operations for node 308, the device assigned to the third subgraph 320 can perform operations for node 312. The device assigned to the third subgraph 320 then determines whether input from node 310 has been received. The device can wait to perform operations for node 312 until the device receives the input from node 310.

After a final node, i.e., node 316, performs operations, the device to which the node is assigned can return an output of the node or an indication that processing of the graph is complete to the system. The system can then, if necessary, return the output to the client.

Figure 4:
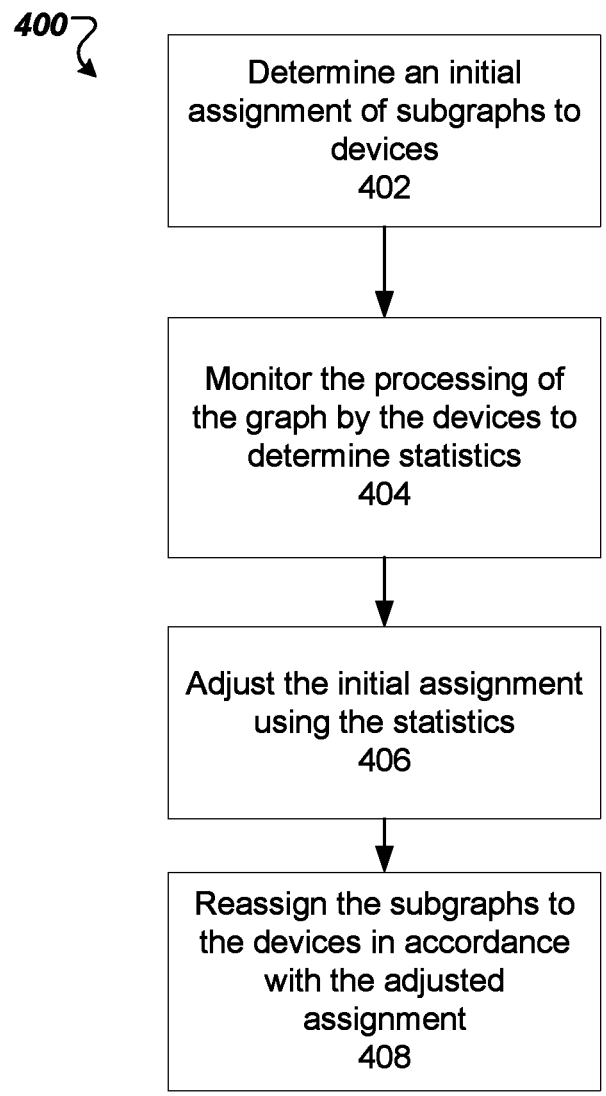
FIG. 4 is a flow diagram of an example process for assigning subgraphs to devices.

FIG. 4 is a flow diagram of an example process 400 for assigning subgraphs to devices. For convenience, the process 400 will be described as being performed by a system of one or more computers located in one or more locations. For example, a computational graph system, e.g., the computational graph system 100 of FIG. 1, appropriately programmed, can perform the process 400.

The system determines an initial assignment of subgraphs to devices (step 402). In this specification, assigning a subgraph to a device refers to assigning the operations represented by the nodes in the subgraph to a device for processing. The system can determine the initial assignment to devices using a greedy algorithm. That is, the system determines a device to which a subgraph is assigned by analyzing one or more initial nodes in the subgraph. The initial nodes are nodes from which data starts flowing in the subgraph.

In some implementations, the system determines an amount of memory to be consumed by the operation represented by an initial node or by an operation represented by a node connected to the initial node. As described above with reference to FIGS. 2 and 3, the system can analyze dimensions of a tensor to or from the initial nodes to determine the amount of memory to be consumed, as described above with reference to FIG. 2.

Based on the determined amount, the system assigns the subgraph to a device having at least the determined amount of memory. By considering the initial node and not subsequent nodes, the system can quickly assign subgraphs to a device, but the assignments may not be optimal because subsequent nodes may require resources that the assigned device will not be able to efficiently process, e.g., if the assigned device does not have enough memory and thus has to implement paging to perform subsequent operations represented in the subgraph.

The system monitors the processing of the graph by the devices to determine statistics (step 404). For example, the system can monitor operation time, idle time, or both for each of the devices. The operation time is a time a device takes to complete a request from the client. That is, the system measures how long it takes for each device to complete assigned operations of subgraphs. The system can also measure how long each device idles waiting for a subsequent operation during processing of the subgraph assigned to the device.

The system adjusts the initial assignment using the statistics (step 406). In particular, the system can adjust the initial assignment to minimize operation time or idle time, or both. By way of illustration, the system can first assign a first device to perform operations for a first subgraph and a second device to perform operations for a second subgraph based on the respective initial nodes of the first and second subgraphs. After tracking a time to perform the operations, the system can compare utilization of resources between the first device and the second device. If the first device is idle for longer periods of time than the second device, and the first device has more processing power and memory than the second device, the system can adjust the assigning of the first subgraph to the second device and the second subgraph to the first device for subsequent requests for operation using the first and second subgraphs.

The system reassigns the subgraphs to the devices in accordance with the adjusted assignment (step 408). That is, continuing the illustration above, in response to a subsequent request for operation using the first and second subgraphs, the system assigns the first subgraph to the second device and the second subgraph to the first device.

The system can repeat steps 404-408 to continuously update the assignment to improve performance. For example, the system can determine there are multiple possibilities of adjusting assignments to minimize idle time. The system can have the option of assigning a particular subgraph to numerous different devices. On a subsequent operation of the particular subgraph, the system selects a first possibility and measures a first operation time for completion of the operation. On another subsequent operation, the system selects a second possibility during a second iteration and measures a second operation time for completion. On yet another subsequent operation, the system selects the possibility having the shortest operation time and can select a different possibility of assignment for a different subgraph. In some implementations, the system can repeat the steps until a threshold amount of improvement has been achieved.

After devices are assigned to respective subgraphs, the devices perform operations of the respective subgraphs. Upon completing the operations, the devices can notify the system that the operations are complete or outputs of the operations, if any. The request received by the system can, in some cases, specify a response to include one or more outputs of particular nodes in the computational graph. The system can receive, from one or more devices to which the particular devices are assigned, the outputs of the particular nodes after the operations are complete. The system can then provide the outputs to the client, as described above with reference to FIG. 1.

In some implementations, users are able to designate portions of computational graphs, e.g., a subgraph of a computational graph, a node in the computational graph, or a different collection of multiple nodes in the computational graph, as a function that can be re-used as a component of other computational graph. In particular, in these implementations, after providing the system data identifying a computational graph, the user can submit a request to designate a particular portion of the computation graph as a re-usable function and associate the re-usable function with a function name, e.g., a system-generated identifier or a user-specified logical name. The system can then save data identifying the nodes and edges in the particular portion and associating the portion with the function name. At a later time, the system may receive a request to process another computational graph that includes a reference to the function, e.g., an indication that the output of a particular node in the other computational graph should be provided as input to a function having the function name and the output of the function should be provided as input to another particular node in the other computational graph. In response to the request, the system can identify the graph portion associated with the functional name and can generate an augmented computational graph that includes the graph portion at the appropriate position. The system can then process the augmented computational graph as described above. Thus, users can easily include certain commonly re-used operations, e.g., operations of a particular configuration of neural network layers, in their computational graph without having to re-generate the portion of the graph representing those operations each time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:

receiving a request from a client to process a computational graph;

obtaining data representing the computational graph, the computational graph comprising a plurality of nodes and directed edges, wherein each node represents a respective operation, wherein each directed edge connects a respective first node to a respective second node that represents an operation that receives, as input, an output of an operation represented by the respective first node, wherein outputs flowing along the directed edges in the computational graph are tensors;

identifying a plurality of available devices for processing the computational graph, wherein the available devices include two devices having different amounts of memory;

partitioning the computational graph into a plurality of subgraphs, each subgraph comprising one or more nodes in the computational graph;

determining a respective estimated maximum memory requirement for each subgraph that represents an estimated amount of memory to execute any one operation in the subgraph, wherein a first subgraph of the plurality of subgraphs has a respective estimated maximum memory requirement different than a respective estimated maximum memory requirement of a second subgraph of the plurality of subgraphs, and wherein determining the respective estimated maximum memory requirement for each subgraph comprises estimating the respective estimated maximum memory requirement for each sub graph as an amount of memory required to store a respective tensor with a largest dimension flowing in the subgraph; and assigning, for each subgraph, the operations represented by the one or more nodes in the subgraph to a respective available device in the plurality of available devices for processing, including assigning the subgraph to a device having an amount of memory that is greater than or equal to the respective estimated maximum memory requirement of the subgraph.

2. The method of claim 1, wherein the request from the client identifies a particular type of device to perform an operation represented by a particular node of the computational graph, and wherein assigning, for each subgraph, the operations represented by the one or more nodes in the subgraph comprises:

assigning a third subgraph of the plurality of subgraphs and having the particular node to a device of the particular type of device specified by the request, wherein the device assigned the third subgraph has an amount of memory that is greater than or equal to an estimated maximum memory requirement for the third subgraph.

3. The method of claim 1, wherein assigning, for each subgraph, the operations represented by the one or more nodes in the subgraph comprises:

determining that a fourth subgraph of the plurality of subgraphs requires, as an input an output from a first node in a third subgraph of the plurality of subgraphs and that is different from the fourth subgraph; and waiting to assign the fourth subgraph to a device until the operation represented by the first node in the third subgraph has been completed.

4. The method of claim 1, wherein outputs flowing along directed edges in the computational graph are tensors, and the method further comprises:

traversing each subgraph to calculate a dimension of a tensor on each directed edge to and from each node of the subgraph to determine a respective size of memory that would be consumed by a device to perform the operations represented by the nodes of the subgraph.

5. The method of claim 1, wherein the request identifies one or more outputs from one or more respective nodes in the computational graph, the method further comprising:

for each of the devices to which a subgraph was assigned, causing the device to perform the operations represented by the nodes of the subgraph assigned to the device; and providing the one or more outputs to the client.

6. A system comprising:

one or more computers; and computer-readable medium coupled to the one or more computers and having instructions stored thereon, which, when executed by the one or more computers, cause the one or more computers to perform operations comprising:

receiving a request from a client to process a computational graph;

obtaining data representing the computational graph, the computational graph comprising a plurality of nodes and directed edges, wherein each node represents a respective operation, wherein each directed edge connects a respective first node to a respective second node that represents an operation that receives, as input, an output of an operation represented by the respective first node, wherein outputs flowing along the directed edges in the computational graph are tensors;

identifying a plurality of available devices for processing the computational graph, wherein the available devices include two devices having different amounts of memory;

partitioning the computational graph into a plurality of subgraphs, each subgraph comprising one or more nodes in the computational graph; and determining a respective estimated maximum memory requirement for each subgraph that represents an estimated amount of memory to execute any one operation in the subgraph, wherein a first subgraph of the plurality of subgraphs has a respective estimated maximum memory requirement different than a respective estimated maximum memory requirement of a second subgraph of the plurality of subgraphs, and wherein determining the respective estimated maximum memory requirement for each subgraph comprises estimating the respective estimated maximum memory requirement for each sub graph as an amount of memory required to store a respective tensor with a largest dimension flowing in the subgraph;

assigning, for each subgraph, the operations represented by the one or more nodes in the subgraph to a respective available device in the plurality of available devices for processing, including assigning the subgraph to a device having an amount of memory that is greater than or equal to the respective estimated maximum memory requirement of the subgraph.

7. The system of claim 6, wherein the request from the client identifies a particular type of device to perform an operation represented by a particular node of the computational graph, and wherein assigning, for each subgraph, the operations represented by the one or more nodes in the subgraph comprises:

assigning a third subgraph of the plurality of subgraphs and having the particular node to a device of the particular type of device specified by the request, wherein the device assigned the third subgraph has an amount of memory that is greater than or equal to an estimated maximum memory requirement for the third subgraph.

8. The system of claim 6, wherein assigning, for each subgraph, the operations represented by the one or more nodes in the subgraph comprises:

determining that a fourth subgraph of the plurality of subgraphs requires, as an input, an output from a first node in a third subgraph of the plurality of subgraphs and that is different from the fourth subgraph; and waiting to assign the fourth subgraph to a device until the operation represented by the first node in the third subgraph has been completed.

9. The system of claim 6, wherein outputs flowing along directed edges in the computational graph are tensors, and the operations further comprise:

traversing each subgraph to calculate a dimension of a tensor on each directed edge to and from each node of the subgraph to determine a respective size of memory that would be consumed by a device to perform the operations represented by the nodes of the subgraph.

10. The system of claim 6, wherein the request identifies one or more outputs from one or more respective nodes in the computational graph, and the operations further comprise:

for each device to which a subgraph was assigned, causing the device to perform the operations represented by the nodes of the subgraph assigned to the device; and providing the one or more outputs to the client.

11. A non-transitory computer-readable medium having instructions stored thereon, which, when executed by one or more computers, cause the one or more computers to perform operations comprising:

receiving a request from a client to process a computational graph;

obtaining data representing the computational graph, the computational graph comprising a plurality of nodes and directed edges, wherein each node represents a respective operation, wherein each directed edge connects a respective first node to a respective second node that represents an operation that receives, as input, an output of an operation represented by the respective first node, wherein outputs flowing along the directed edges in the computational graph are tensors;

identifying a plurality of available devices for processing the computational graph, wherein the available devices include two devices having different amounts of memory;

partitioning the computational graph into a plurality of subgraphs, each subgraph comprising one or more nodes in the computational graph; and determining a respective estimated maximum memory requirement for each subgraph that represents an estimated amount of memory to execute any one operation in the subgraph, wherein a first subgraph of the plurality of subgraphs has a respective estimated maximum memory requirement different than a respective estimated maximum memory requirement of a second subgraph of the plurality of subgraphs, and wherein determining the respective estimated maximum memory requirement for each subgraph comprises estimating the respective estimated maximum memory requirement for each sub graph as an amount of memory required to store a respective tensor with a largest dimension flowing in the subgraph;

assigning, for each subgraph, the operations represented by the one or more nodes in the subgraph to a respective available device in the plurality of available devices for processing, including assigning the subgraph to a device having an amount of memory that is greater than or equal to the respective estimated maximum memory requirement of the subgraph.

12. The computer-readable medium of claim 11, wherein the request from the client identifies a particular type of device to perform an operation represented by a particular node of the computational graph, and wherein assigning, for each subgraph, the operations represented by the one or more nodes in the subgraph comprises:

assigning a third subgraph of the plurality of subgraphs and having the particular node to a device of the particular type of device specified by the request, wherein the device assigned the third subgraph has an amount of memory that is greater than or equal to an estimated maximum memory requirement for the third subgraph.

13. The computer-readable medium of claim 11, wherein assigning, for each subgraph, the operations represented by the one or more nodes in the subgraph comprises:

determining that a fourth subgraph of the plurality of subgraphs requires as an input an output from a first node in a third subgraph of the plurality of subgraphs and that is different from the fourth subgraph; and waiting to assign the fourth subgraph to a device until the operation represented by the first node in the third subgraph has been completed.

14. The computer-readable medium of claim 11, wherein outputs flowing along directed edges in the computational graph are tensors, and the operations further comprise:

traversing each subgraph to calculate a dimension of a tensor on each directed edge to and from each node of the subgraph to determine a respective size of memory that would be consumed by a device to perform the operations represented by the nodes of the subgraph.

15. The computer-readable medium of claim 11, wherein the request identifies one or more outputs from one or more respective nodes in the computational graph, and the operations further comprise:

for each device to which a subgraph was assigned, causing the device to perform the operations represented by the nodes of the subgraph assigned to the device; and providing the one or more outputs to the client.

16. The method of claim 1, wherein inputs flowing along the directed edges in the computational graph are tensors, each subgraph comprises an initial node that receives, as input, an input for the subgraph, and wherein determining the respective estimated maximum memory requirement for each subgraph comprises:

determining, for each subgraph, a dimension of input to an initial node of the subgraph, wherein the dimension of the input to the initial node of the subgraph is the respective estimated maximum memory requirement for the subgraph.

17. The method of claim 1, further comprising:
after assigning, for each subgraph, the operations represented by the one or more nodes in the subgraph:
monitoring, for each subgraph, execution of the operations represented by the one or more nodes in the subgraph,
obtaining, from monitoring execution of the operations, respective statistical data for each subgraph, and
re-assigning one or more subgraphs to different devices of the plurality of available devices based on respective statistical data for each subgraph.

18. The system of claim 6, wherein inputs flowing along the directed edges in the computational graph are tensors, each subgraph comprises an initial node that receives, as input, an input for the subgraph, and wherein determining the respective estimated maximum memory requirement for each subgraph comprises:
determining, for each subgraph, a dimension of input to an initial node of the subgraph, wherein the dimension of the input to the initial node of the subgraph is the respective estimated maximum memory requirement for the subgraph.

19. The system of claim 6 wherein the operations further comprise:
after assigning, for each subgraph, the operations represented by the one or more nodes in the subgraph:
monitoring, for each subgraph, execution of the operations represented by the one or more nodes in the subgraph,
obtaining, from monitoring execution of the operations, respective statistical data for each subgraph, and
re-assigning one or more subgraphs to different devices of the plurality of available devices based on respective statistical data for each subgraph.

20. The computer-readable medium of claim 11, wherein inputs flowing along the directed edges in the computational graph are tensors, each subgraph comprises an initial node that receives, as input, an input for the subgraph, and wherein determining the respective estimated maximum memory requirement for each subgraph comprises:
determining, for each subgraph, a dimension of input to an initial node of the subgraph, wherein the dimension of the input to the initial node of the subgraph is the respective estimated maximum memory requirement for the subgraph.

21. The computer-readable medium of claim 11, wherein the operations further comprise:
after assigning, for each subgraph, the operations represented by the one or more nodes in the subgraph:
monitoring, for each subgraph, execution of the operations represented by the one or more nodes in the subgraph,
obtaining, from monitoring execution of the operations, respective statistical data for each subgraph, and
re-assigning one or more subgraphs to different devices of the plurality of available devices based on respective statistical data for each subgraph.

* * * * *